(12) United States Patent
Morrison

(10) Patent No.: US 10,133,360 B2
(45) Date of Patent: Nov. 20, 2018

(54) INFORMATION HANDLING SYSTEM LOW PROFILE KEYBOARD

(71) Applicant: Dell Products L.P., Round Rock, TX (US)

(72) Inventor: Jason S. Morrison, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 15/058,361

(22) Filed: Mar. 2, 2016

(65) Prior Publication Data

US 2017/0255277 A1    Sep. 7, 2017

(51) Int. Cl.
*G06F 3/02*    (2006.01)
*G06Q 10/02*    (2012.01)

(52) U.S. Cl.
CPC .......... *G06F 3/0219* (2013.01); *G06F 3/0221* (2013.01); *G06Q 10/02* (2013.01)

(58) Field of Classification Search
CPC ...... G06F 3/0219; G06F 3/0221; G06Q 10/02
See application file for complete search history.

(56) References Cited

U.S. PATENT DOCUMENTS

2002/0069483 A1* 6/2002 Savolainen ........... G06F 1/1616
                                                          16/308
2005/0128108 A1* 6/2005 Fong ..................... G06F 3/0219
                                                          341/22

* cited by examiner

*Primary Examiner* — Shaheda Abdin
(74) *Attorney, Agent, or Firm* — Zagorin Cave LLP; Robert Holland

(57) ABSTRACT

A portable information handling system keyboard extends and retracts keys of a keyboard based upon one or more predetermined conditions, such as a power on command, a power off command and a rotational position of a housing lid and main portion. A nickel titanium alloy wire actuates retraction and/or extension of keyboard keys with application of a current to the wire.

14 Claims, 7 Drawing Sheets

INFORMATION HANDLING SYSTEM LOW PROFILE KEYBOARD

BACKGROUND OF THE INVENTION

Field of the Invention

The present invention relates in general to the field of information handling system input devices, and more particularly to an information handling system low profile keyboard.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems continue to shrink in size and increase in capability. Reduced physical size is made practical in part by decreased size and increased capability of processing components used to build portable information handling systems, such as central processing units (CPUs) and graphical processing units (GPUs). Generally, portable information handling system housing size in length and width (X and Y vectors) are driven by the size of the flat panel display integrated in the housing. Tablet information handling systems have a planar housing with a display integrated on one side across most of the width and height. Convertible portable information handling systems typically integrate a display in a lid housing portion that rotationally couples to a main housing portion holding the processing components. Tablet information handling systems accept end user typed inputs by presenting a keyboard at a touchscreen display. Convertible portable information handling systems typically integrate a physical keyboard in an upper surface of the main housing portion. End users tend to prefer a mechanical keyboard when performing tasks that have more input interactions, such as word processing. Placing a keyboard on an upper surface of a main housing portion provides a convenient configuration for typed inputs by rotating the lid 90 degrees to that the display is raised in a viewing position. Fully convertible systems rotate the lid 360 degrees relative to the main housing portion so that a touchscreen display in a convertible system is also available for use in a tablet configuration.

Including a touchscreen in a convertible system that translates to a tablet configuration provides an end user with greater flexibility for making inputs through a keyboard or touches. Nonetheless, a convertible information handling system tends to have greater thickness than a tablet system due to the room needed to house the keyboard. In part, the greater thickness relates to standards that define how much vertical movement a key should have. The key movement increases the Z height of a portable information handling system housing with the key extending outwards to provide a discernible input location and moving inwards responsive to a user press to provide an input to processing components of the information handling system. One alternative to reduce system thickness or Z height is to reduce the amount of key travel that occurs responsive to a press, however, this approach does not comply with standards and provides end users with an uncomfortable user experience. As a result, convertible portable information handling systems typically have a greater thickness to accommodate full travel of integrated keyboards.

Another difficulty that arises with incorporation of a keyboard in a convertible system is that when the screen is rotated 360 degrees to use as a tablet, the keys are present on the backside of the system and the user can feel them moving. This is an annoyance to the user. One solution to negate this movement is to raise the housing lattice relative to the keys are held up in the extend position. Another alternative solution is to withdraw the keys into the housing as if all keys are simultaneously pressed. Raising the housing eliminates the moving key feeling in 360 mode but still requires the full key travel to be designed into the thickness of the system. Withdrawing the keys into the housing eliminates the moving key feeling in 360 mode and allows the key travel to be removed for the system thickness when it is closed or in 360 mode.

SUMMARY OF THE INVENTION

Therefore, a need has arisen for a system and method which provides an information handling system low profile keyboard.

In accordance with the present invention, a system and method are provided which substantially reduce the disadvantages and problems associated with previous methods and systems for integrating a low profile keyboard into a portable information handling system. A portable information handling system keyboard keys are selectively retracted and extended with actuation translated by current applied to a shape memory alloy (SMA) wire, such as nickel titanium (NiTi). A keyboard key controller applies current to an SMA wire to move a keyboard between retracted and extended key positions based upon conditions detected at the information handling system.

More specifically, a portable information handling system processes information with processing components disposed in a main housing portion and presents the information as visible images with a display disposed in a lid housing portion that is rotationally coupled to the main housing portion. A keyboard disposed in an upper surface of the main housing portion accepts end user inputs at presses made at keys. A retraction mechanism coupled with the keyboard keys retracts and extends the keys based upon one or more predetermined conditions, such as rotational position of the main and lid housing portions or the power state of the information handling system. As an example, the retraction mechanism includes a NiTi wire coupled to a keyboard support and a current source interfaced with the NiTi wire. To retract the keys, a current pulse applied to the NiTi wire shortens the wire and pulls the keyboard support to a position having the keys withdrawn under the main housing upper support surface. A position lock maintains the keyboard support in the retracted position until released, such as by actuation of second NiTi wire aligned to move the keyboard support in an opposing direction.

The present invention provides a number of important technical advantages. One example of an important technical advantage is that a keyboard automatically extends and retracts at a portable housing based upon an intended use. When a portable housing rotates to a closed configuration, keyboard keys retract into the housing to allow a minimal Z height for the system when stored. At power-up, keys retract and extend based upon the housing configuration or other indicia of an end user's intended use case. Retraction and extension is motivated by application of current to wire of nickel titanium alloy, also known as memory wire, which has minimal impact on the overall system height. Pulsed current applied to the memory wire reduces power consumption related to keyboard movement. Physical locks that keep a keyboard in a retracted or extended position allows movement to be accomplished with minimal application of current for limited time durations. Retraction or extension of keys becomes a programmatically controlled feature that an end user manages according to the end user's preferences.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system low profile keyboard selectively extends and retracts keys through activation of a nickel titanium wire with current. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
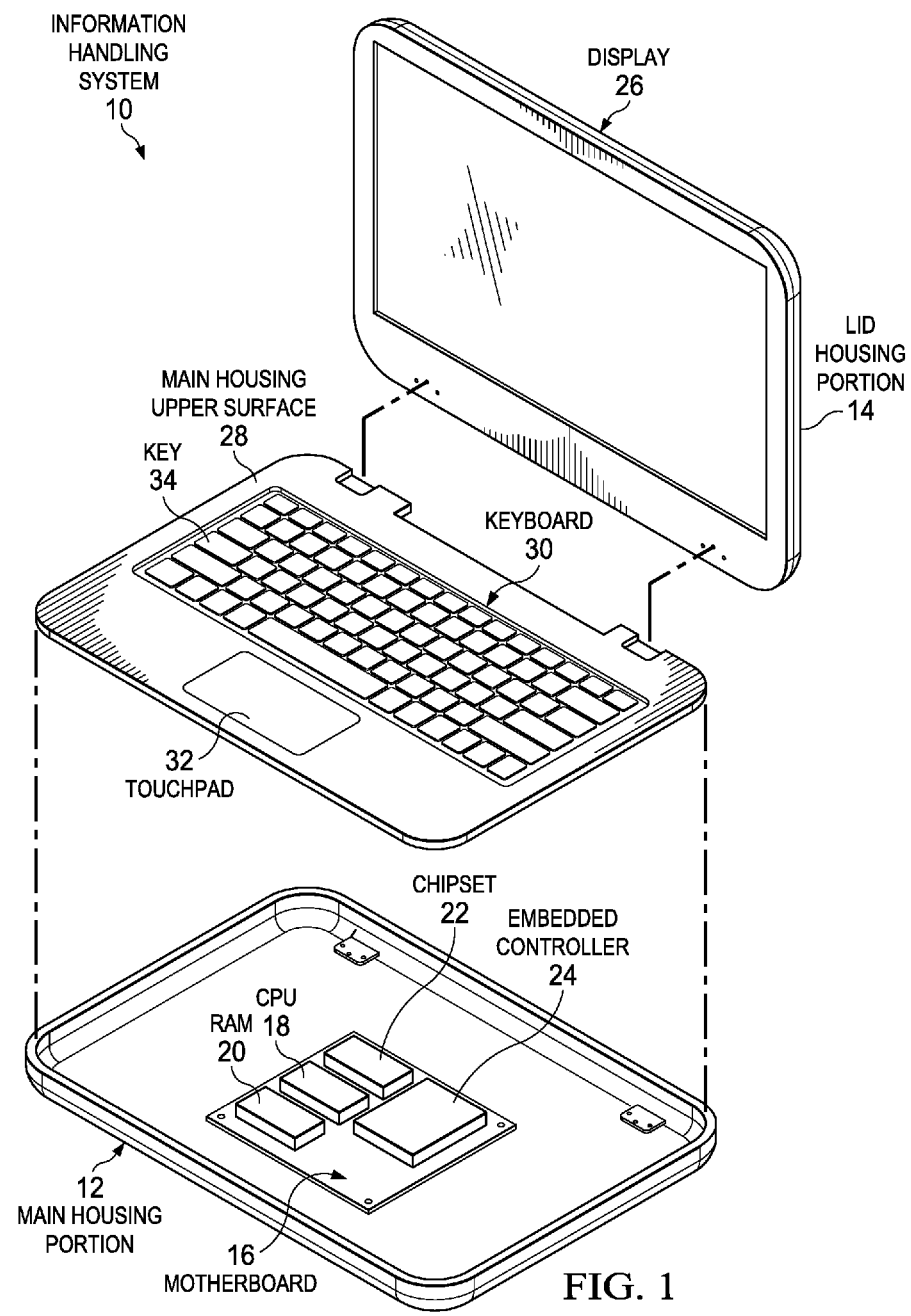
FIG. 1 depicts a blown-up view of a portable information handling system keyboard having selectively extended and retracted keys.

Referring now to FIG. 1, a blown-up view of a portable information handling system 10 depicts a keyboard 30 having selectively extended and retracted keys 34. Portable information handling system 10 is built in a housing having a main housing portion 12 rotationally coupled to a lid housing portion 14. Main housing portion 12 contains processing components for processing information. In the example embodiment, a motherboard 16 provides communication between a central processing unit (CPU) 18, random access memory (RAM) 20, a chipset 22 and an embedded controller 24, also known as a keyboard controller. Chipset 22 includes a variety of processing resources and firmware, such as a BIOS, that cooperate to coordinate communication between an operating system running on CPU 18 and hardware components, such as a graphics processor that processes information to generate visual images for presentation at a display 26. Embedded controller 24 is generally considered part of the chipset and runs BIOS code to manage input and output (I/O) devices and mange power, such as by application of an input at a power switch to turn the system on and off. In alternative embodiments, alternative types of hardware configurations may be used with a variety processor, memory and firmware components. For example, in one alternative embodiment, processing components are included in lid housing portion 14, which separates from housing portion 12 to operate as a tablet having a detachable keyboard.

In the example embodiment, a main housing upper surface 28 integrates a keyboard 30 and couples over the processing components to enclose the interior of main housing portion 12. A touchpad 32 is depicted in the upper surface 28, although various touch devices and input devices may or may not be included. Keyboard 30 has plural keys 34 that extend outward from upper surface 28 to accept end user inputs as key presses that depress keys 34 towards main housing portion 12's interior. Keyboard 30 communicates the key presses as inputs to embedded controller 34, which makes the inputs available to the operating system and/or applications running on CPU 18. For example, keyboard 30 integrates a conventional membrane or other device that detects key presses and generates an input signal that indicates which key 34 was pressed. In order to reduce the Z height of information handling system 10, keyboard 30 includes a mechanism and logic to selectively retract and extend keys 34 as described in greater detail below.

Figure 2A:
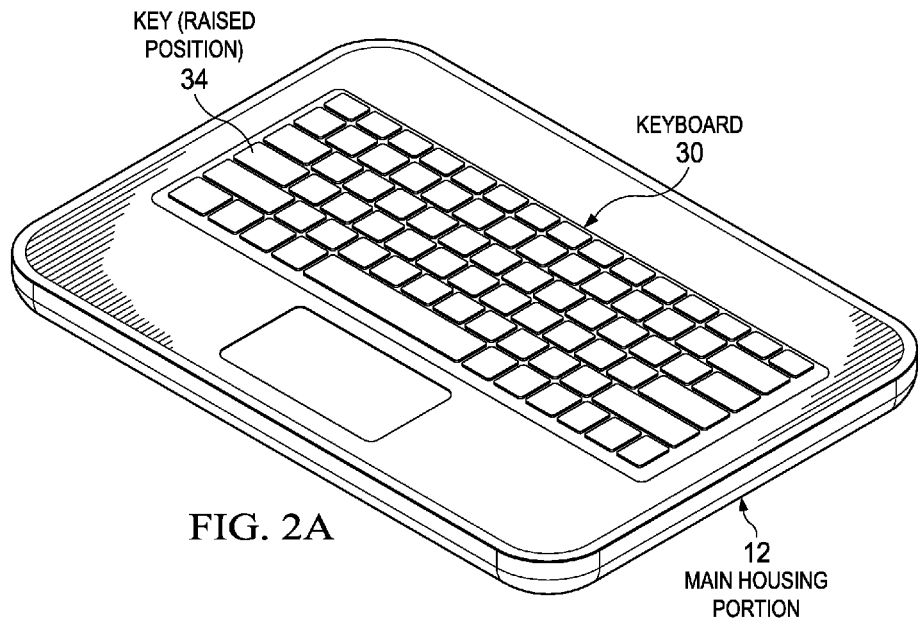
FIGS. 2A and 2B illustrate an example embodiment of the reduced Z height available from selective extension and retraction of keyboard keys.
Figure 2B:
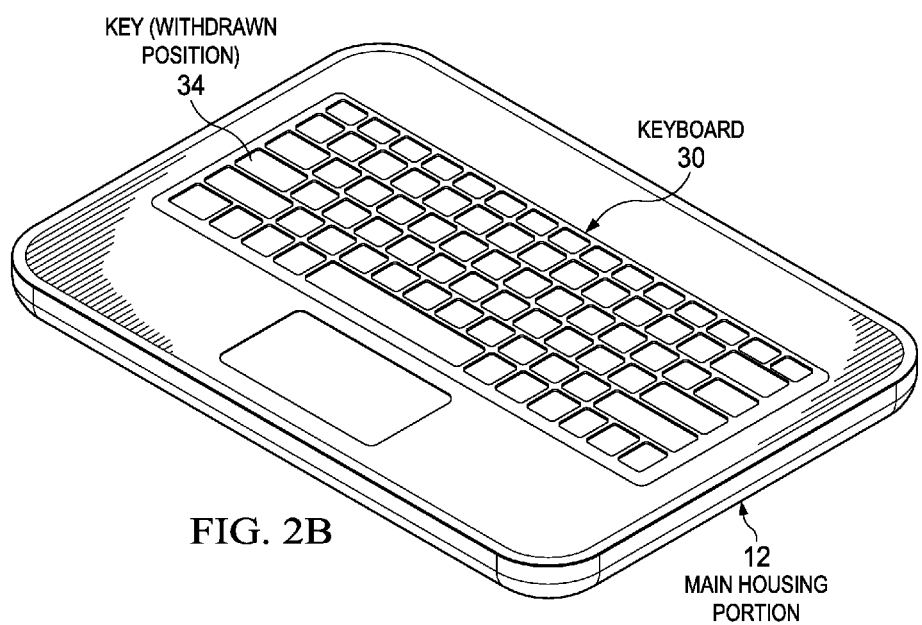

Referring now to FIGS. 2A and 2B, the reduced Z height available from selective extension and retraction of keys 34 is illustrated. FIG. 2A shows keys 34 in a raised position relative to main housing portion 12 upper surface 28. In the raised position, an end user makes an input by pressing a key 34 downward. FIG. 2B shows keys 34 in a depressed position relative to main housing portion 12 upper surface 28. In the example embodiment, all of keys 34 are retracted into main housing portion 12, thus effectively reducing the overall height of portable information handling system 10. Keys 34 selectively retract to reduce system height based upon one or more predetermined conditions. For example, keys 34 retract when the relative position of the housing main and lid portions indicates that extended keys impact user input efficiency, such as when the housings are rotated to a tablet position. As another example, keys 34 retract when an end user is unlikely to need keys 34 to make inputs, such as when system power is off.

Figure 3A:
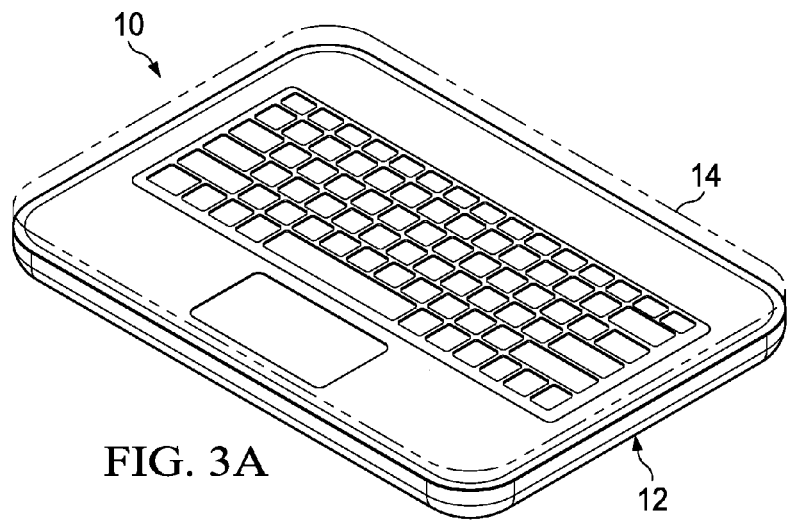
FIGS. 3A, 3B and 3C depict a portable information handling system in closed, clamshell and tablet configurations respectively.
Figure 3B:
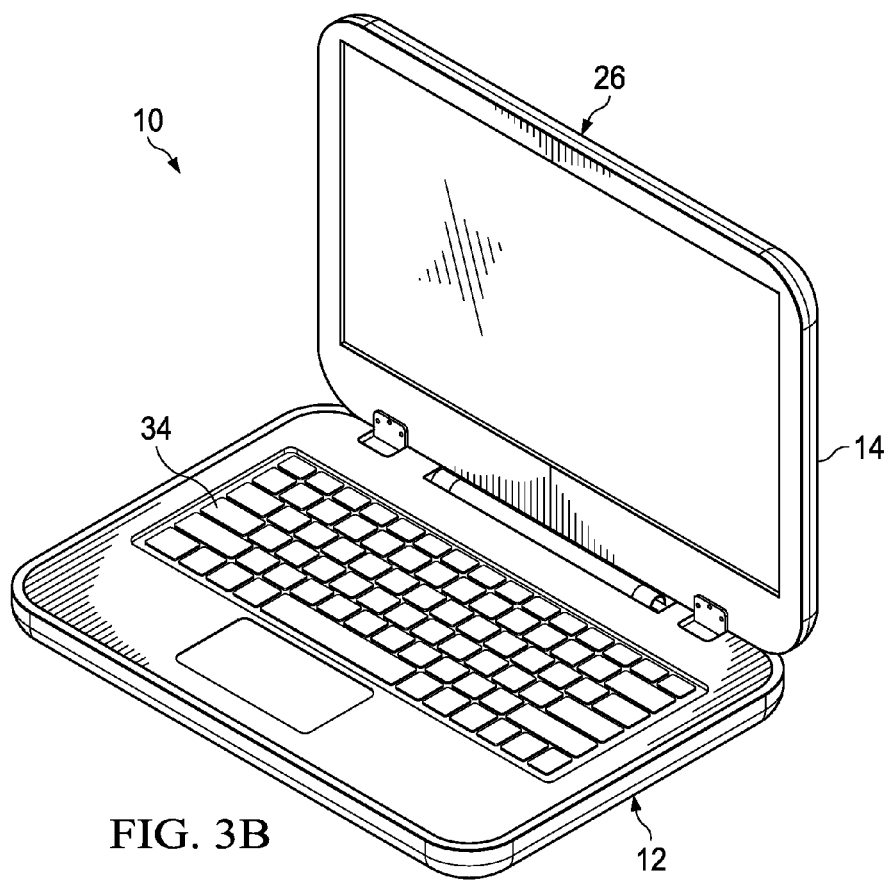
Figure 3C:
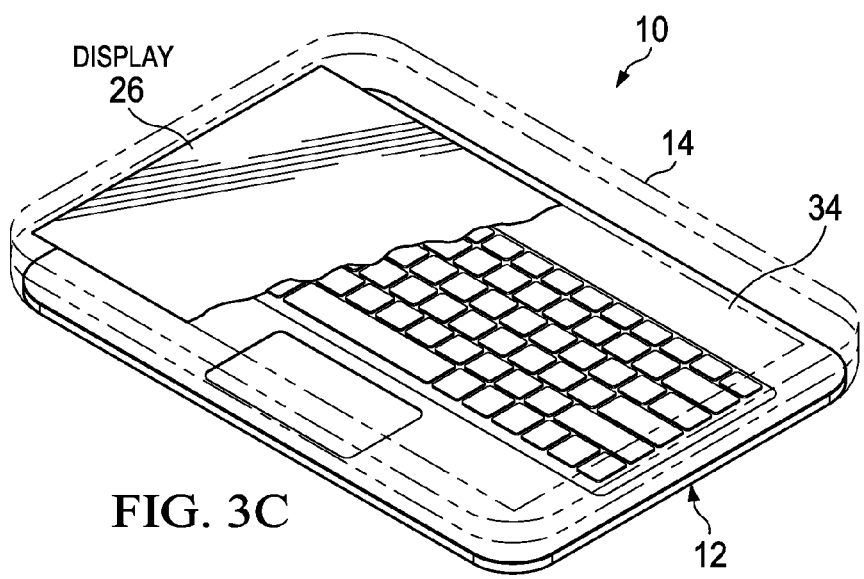

Referring now to FIGS. 3A, 3B and 3C, portable information handling system 10 is depicted in closed, clamshell and tablet configurations respectively. In FIG. 3A, lid housing portion 14 closes over main housing portion 12 upper surface 18 to place display 26 proximate keyboard 30. In the closed position, keys 34 retract into main housing 12 so that the overall height of system 10 does not include space for keys 34 to extend upwards. In FIG. 3B, lid housing portion 14 rotates approximately 90 degrees to a clamshell configuration that holds display 26 in a raised position above keyboard 30, such as to accept end user keyed inputs. In one example embodiment, keys 34 automatically extend when lid portion 14 rotates approximately 20 degrees from the closed position towards the clamshell position, and automatically retract when lid 14 rotates from the clamshell position towards the closed position at approximately 20 degrees open. The relative keyboard position is determined, for example, by motion sensors or position sensors is the lid and main portions. In FIG. 3C, lid housing portion 14 rotates 360 degrees relative to main housing portion 12 to a tablet position having display 26 exposed for user inputs and keyboard 34 on a lower surface to support the system on a surface. In the tablet position, keys 34 retract into main housing portion 12 so that keys 34 do not interfere with end user inputs. In one example embodiment, keys 34 automatically retract as lid portion 14 rotates past the clamshell position to 140 degrees relative to main portion 12. At such a high relative angle, the end user is less likely to use keys 34 to make inputs to information handling system 10. In various embodiments, the relative angle of the lid and main portions is monitored by embedded controller 24 so that key extension and retraction is performed at user configuration settings.

Figure 4:
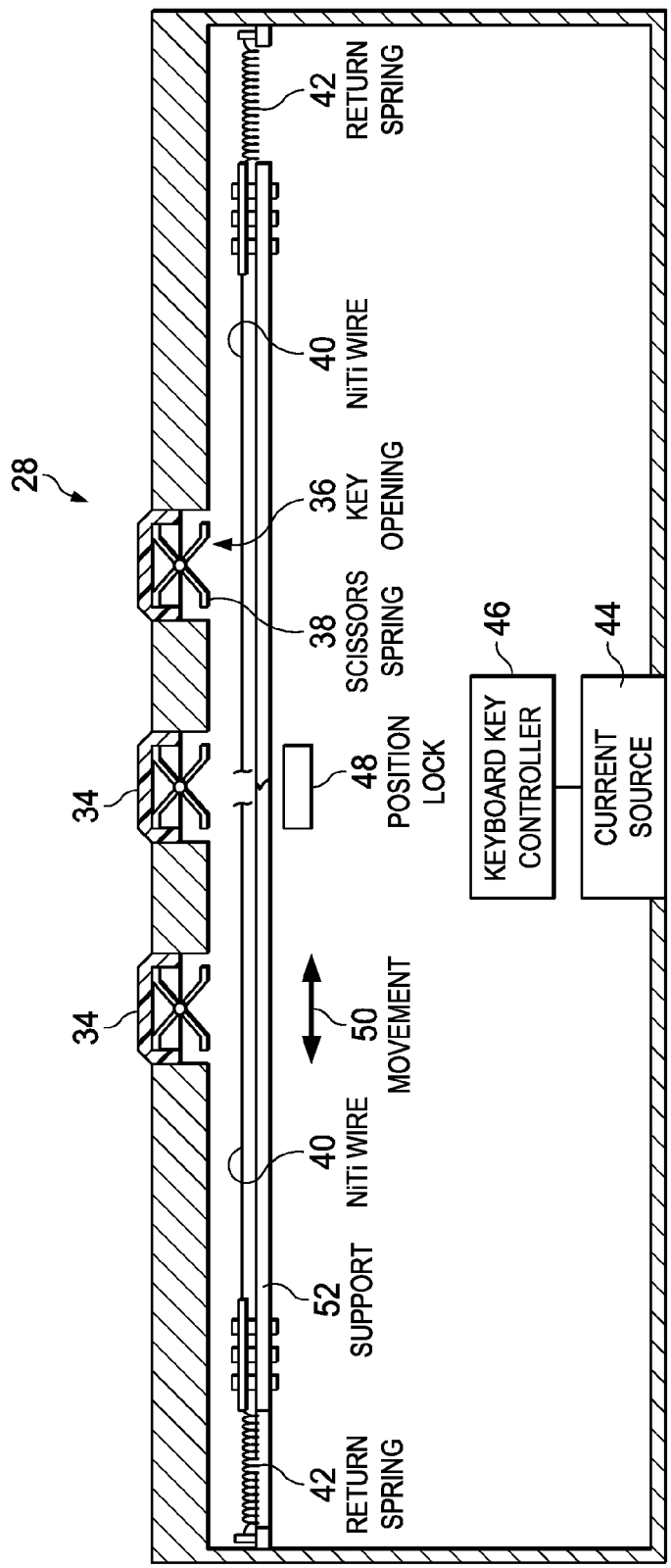
FIG. 4 depicts a side view of key position management performed with current applied to a nickel titanium wire.

Referring now to FIG. 4, a side view depicts key 34 position management performed with current applied to a nickel titanium alloy wire 40. In the example simplified block diagram, keys 34 are biased above surface 28 with a scissor spring mechanism 38 or other similar conventional biasing mechanism. Keys 34 protrude through key openings 36 formed in upper surface 28 and are supported by a support surface 52 disposed under and substantially parallel to upper surface 28. Support surface 52 moves in the direction indicated by arrow 50 along an axis parallel to upper surface 28. As support surface 52 moves, keys 34 press against the sides of openings 36 to have a retraction force applied, such as by an incline of key 34 side surface against opening 28. Once support surface 52 moves a sufficient distance to place keys 34 under upper surface 28, the biasing force of scissors spring 38 is overcome for all keys 34 and all keys 34 are retracted into main housing portion 12. To extend keys 34 from the retracted position, support 52 slides in the opposite direction to align keys 34 with openings 36 so that scissors spring 38 biases keys 34 upward to the extended position. In alternative embodiments, alternative key biasing mechanisms may be used to bias keys 34 in an upward direction as are known in the art.

In the example embodiment of FIG. 4, support 52 is motivated to slide between extended and retracted key positions with a set of nickel titanium (NiTi) alloy wires 42 interfaced with a current source 44. Keyboard key controller 46 commands application of current from current source 44 to NiTi wires 40 to selectively shorten NiTi wires 42 as needed to move support 52 in a desired direction. A return spring 42 associated with each NiTi wire 40 provides a biasing force that biases support 52 to return to a desired position. A position lock 48 selectively engages with support 52 to lock support 52 into a position. In various embodiments, various arrangements of NiTi wire 40, return spring 42 and position lock 48 cooperate under the management of keyboard key controller 46 to adjust the position of support 52 between extended and retracted key 34 configurations in response to detected conditions. For example, in one embodiment both NiTi wires 40 are arranged to pull support 52 to a retracted position in parallel with each other at a simultaneous application of power. Once support 52 is in a retracted position, position lock 48 keeps support 52 in the retracted position until released by keyboard key controller 46, and then return spring 42 biases support 52 to the extended key position aided by the upward bias of scissors spring 38. As another example, each NiTi wire 40 contracts on application of current in an opposite direction so that one NiTi wire 40 moves support 52 to a retracted position and one NiTi wire 40 moves support 52 to an extended position. Keyboard key controller 46 is, for example, BIOS firmware instructions stored on embedded controller 24 that moves keys 34 between extended and retracted positions based upon predetermined conditions, such as housing rotational position and system power state.

Figure 5:
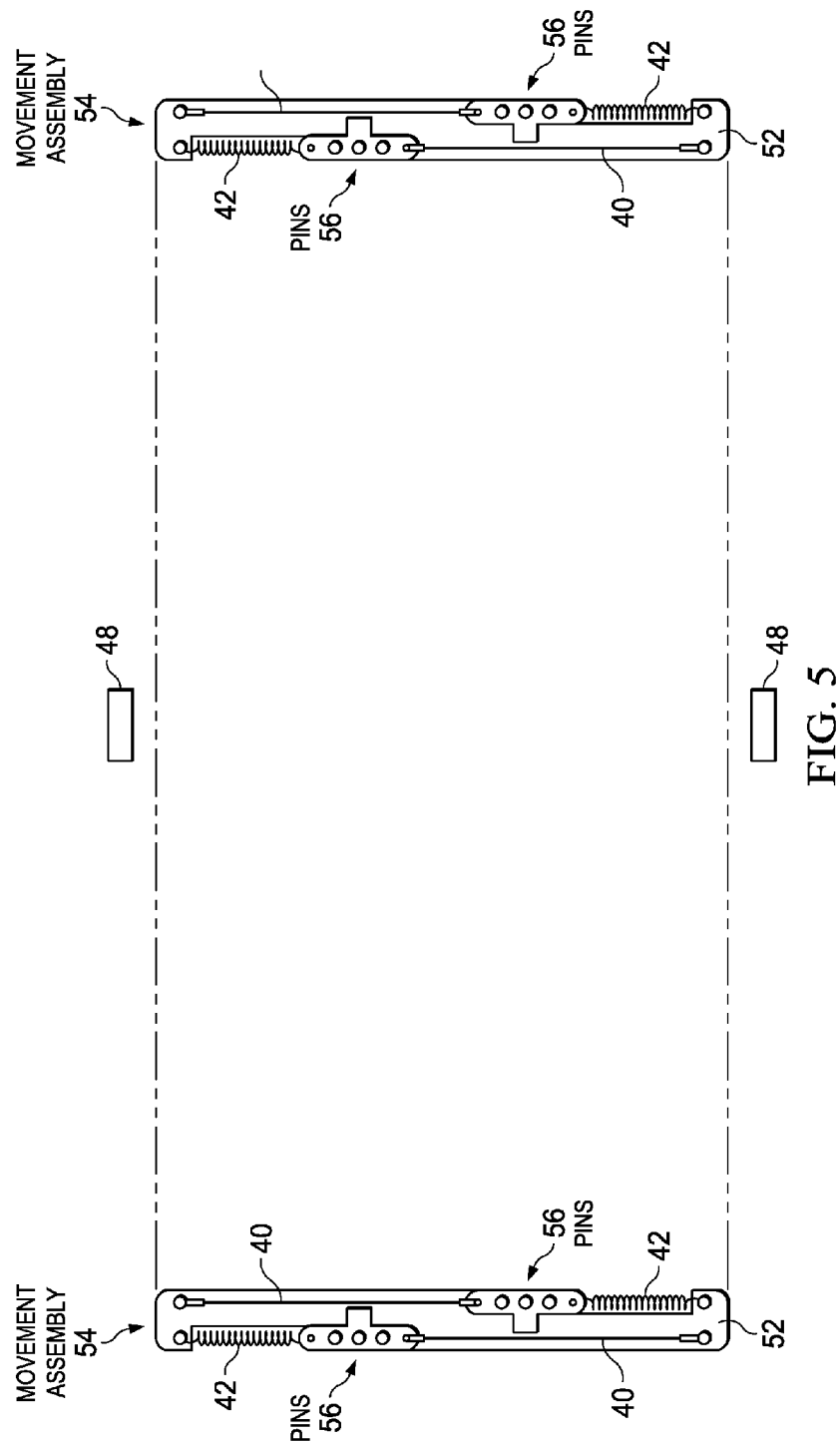
FIG. 5 depicts an upper view of a keyboard having a movement assembly on opposing ends to move keys between retracted and extended positions.

Referring now to FIG. 5, an upper view depicts a keyboard 30 having a movement assembly 54 on opposing ends to move keys between retracted and extended positions. A pair of NiTi wires 40 on each side of movement assembly 54 each slide keyboard 30 support 52 in opposite directions with one NiTi wire 40 sliding support 52 to a retracted key position and one NiTi wire 40 sliding support 52 to an extended key position. Pins 56 of each movement assembly 54 couple to support 52 to translate force from contraction of NiTi wires 40 to motion of support 52. A biasing spring 42 aids opposite motion of support 52. Lock 48 is, for example a magnet that attracts to metal material of support 52 to hold support 52 in position. Lock 48 has sufficient retaining force to prevent movement of support 52 but is overcome by force applied with the contraction of NiTi wire 40. In alternative embodiments, other types of position locks 48 may be used, such as a retaining pin that is released with a NiTi wire or solenoid actuation under the management of keyboard key controller 46. In one alternative embodiment, movement assembly 54 integrates with keyboard 30 as an integral unit. Alternatively, NiTi wire 40 connections to a post in main housing portion 12 provides motion of keyboard 30 relative to a fixed position of main housing portion 12.

Figure 6:
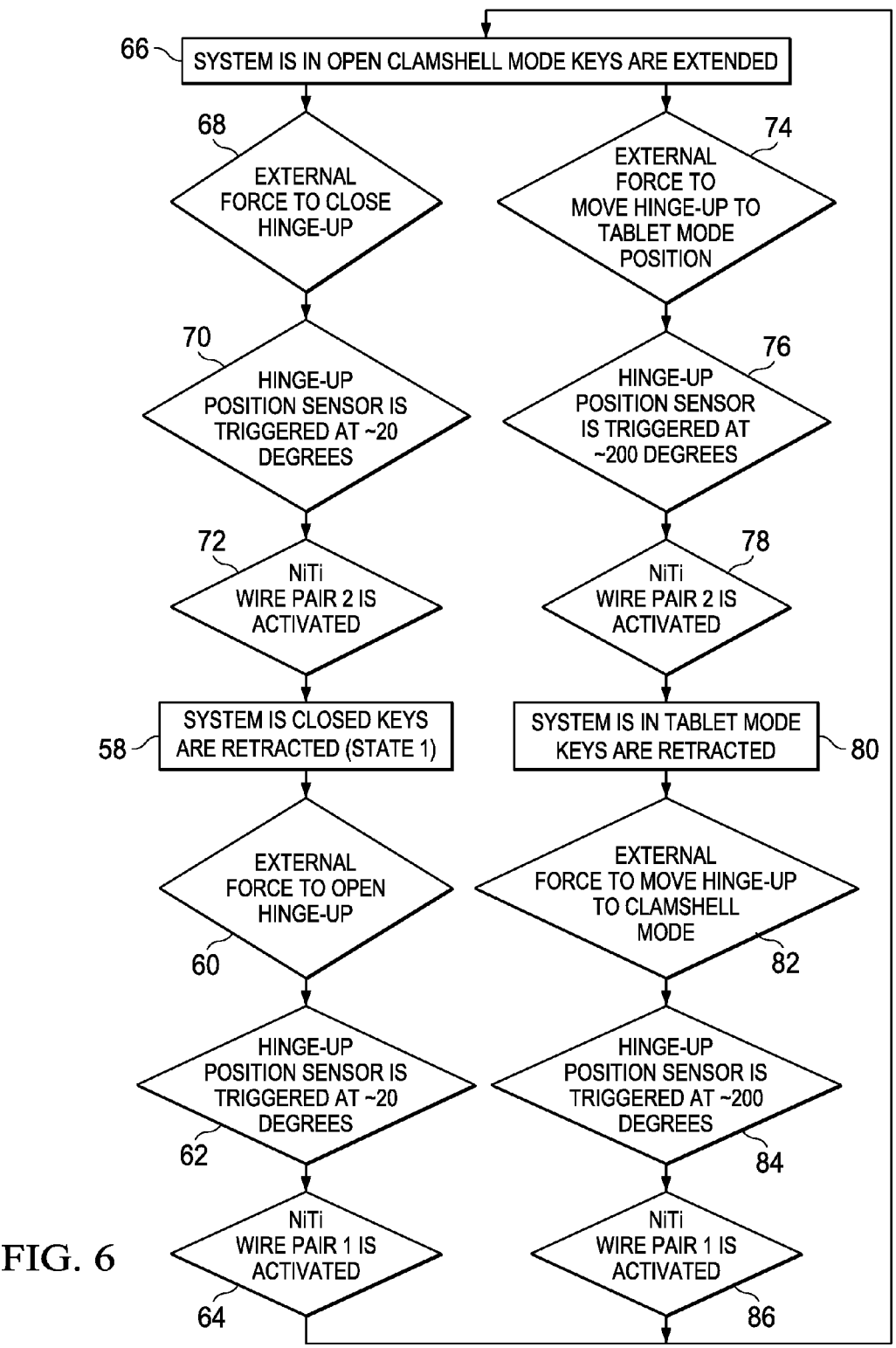
FIG. 6 depicts a flow diagram of a process for selectively moving a keyboard between extended and retracted configurations based upon one or more predetermined conditions.

Referring now to FIG. 6, a flow diagram depicts a process for selectively moving a keyboard between extended and retracted configurations based upon one or more predetermined conditions. The process starts at step 58 with the information handling system closed with keys retracted in a power off state. At step 60, an external force moves main and lid housing portions relative to each other. At step 62, a sensor(s) in the information handling system detects a relative rotation of the main and lid portions by 20 degrees. At step 64, in response to the detection of the relative rotation of 20 degrees, the NiTi wire has current applied to cause the retracted keys to extend to an extended position. In one alternative embodiment, an additional condition of power on at the information handling system may be required to extend keys 34. At step 66, the information handling system lid is open in a clamshell mode with the keys extended to accept end user inputs. From step 66, the relative positions of housing portions are monitored to detected further opening and/or closing motion. At step 68 if a closing motion is detected, the process monitors for closing of the housing portions relative to each other to within 20 degrees at step 70. Once a 20 degree or lesser closing position is detected, the process continues to step 72 to activate an opposing NiTi wire with current, thus retracting the keys and returning to step 58.

If at step 66 motion is detected at step 74 that opens the housings relative to each other past the clamshell position, the process continues to step 76 so that at a relative opening angle of 200 degrees a condition is triggered indicating that retraction of the keys should occur. At step 78, current in applied to a NiTi wire to move the keys to a retracted position and, at step 80 the system is determined to be in a tablet mode having the keys retracted to enable resting on a surface support. For step 80, the relative position of the housing portions is monitored to detection motion from the tablet configuration back to a clamshell configuration. If force or motion is detected at step 82, the process monitors the relative position of housing portions at step 84 to detect rotation back to within 200 degrees. Once the relative housing rotation positions is determined to correlate to a position having the keys extended, the process continues to step 86 to activate the NiTi wire and extend the keys for return to step 66.

Advantageously, motion of keys between retracted and extended positions is performed with a pulsed and temporary application of current at the NiTi wire. A current pulse of relative short duration provides movement of keys to retracted or extended positions so that minimal power is consumed by key extension or retraction. As an example, a 0.010 inch 80 mm long NiTi wire driven by 3V at a current of 3.07 Amps will use 9.22 W of power for an actuation time of approximately a half second. In such an embodiment, a 50 W-hour battery could cycle a keyboard 40,000 times. Managing power application to NiTi wire from the embedded controller allows control of key positions in response to power state at the information handling system as configured by an end user. Although the example embodiment uses NiTi wire, in alternative embodiments, alternative types of shape memory alloys (SMAs) could be used.

Although the present invention has been described in detail, it should be understood that various changes, substitutions and alterations can be made hereto without departing from the spirit and scope of the invention as defined by the appended claims.

What is claimed is:
1. A portable information handling system comprising:
 a housing having an upper surface;
 a processor disposed in the housing and operable to execute instructions to process information;
 a memory disposed in the housing and interfaced with the processor, the memory operable to store the information;
 a display disposed in the housing and interfaced with the processor and memory, the display operable to present the information as visual images;
 a keyboard disposed at the upper surface, the keyboard having plural keys that move perpendicular to the upper surface to accept end user inputs;
 a support disposed in the housing and coupled to the keyboard, the support movable parallel to the upper surface between an extended position having the keys extended out of the upper surface and a retracted position having the keys retracted within the upper surface;
 a nickel titanium alloy wire coupled to the housing and the support; and
 a current controller operable to selectively provide current to the nickel titanium alloy wire, the current heating the wire, the heat shortening the nickel titanium alloy wire to move the support to one of the extended and retracted positions, the retracted position altering the keyboard key height to below the housing upper surface.

2. The portable information handling system of claim 1 further comprising first and second nickel titanium alloy wires, the first nickel titanium alloy wire shortening responsive to current to move the support to the retracted position, the second nickel titanium alloy wire shortening responsive to current to move the support to the extended position.

3. The portable information handling system of claim 1 further comprising a spring biasing support opposite the movement provided by the shortening.

4. The portable information handling system of claim 3 further comprising a position lock coupled to the housing and engaged with the support by movement responsive to the shortening.

5. The portable information handling system of claim 4 wherein the position lock comprises a magnet.

6. The portable information handling system of claim 1 wherein the housing further comprises a main portion rotationally coupled to a lid portion, the display integrated in the lid portion, the keyboard integrated in the main portion.

7. The portable information handling system of claim 6 wherein the current controller moves the support to the retracted position when the angle between the lid portion and main portion is greater than a predetermine amount and less than a predetermined amount.

8. The portable information handling system of claim 7 wherein the current controller is further operable to move the support to the retracted position at power off of the information handling system.

9. A method for adjusting portable information handling system keyboard keys between extended and retracted positions, the method comprising:
 detecting a predetermined condition at the portable information handling system;
 in response to the predetermined condition, applying a current to a nickel titanium alloy wire, the current shortening the wire length; and
 moving a keyboard component with the shortening the wire length, the moving keyboard component altering the keyboard height relative to a housing upper surface of the portable information handling system.

10. The method of claim 9 wherein the predetermined condition comprises actuation of a power button to change a power state of the portable information handling system.

11. The method of claim 10 wherein:
 actuating a power button further comprises turning power on at the portable information handling system; and
 moving a keyboard component further comprises extending the keys from a retracted position within the housing to an extended position outside the housing.

12. The method of claim 11 wherein locking further comprises engaging a magnet associated with the keyboard to an attracting element.

13. The method of claim 10 wherein:
 actuating a power button further comprises turning power off at the portable information handling system; and
 moving a keyboard component further comprises retracting the keys from an extended position outside the housing to a retracted position within the housing.

14. The method of claim 9 further comprising:
biasing the keyboard component opposite the moving;
locking the keyboard in position after the moving; and
releasing the locking responsive to a predetermined condition, the releasing biasing the keyboard component to return to an original position.

* * * * *